May 8, 1962  R. R. DILLON  3,033,033
FORCE MEASURING APPARATUS
Filed Nov. 24, 1958  2 Sheets-Sheet 1

INVENTOR.
RALPH R. DILLON
BY Elliott & Pastoriza
ATTORNEYS

May 8, 1962  R. R. DILLON  3,033,033
FORCE MEASURING APPARATUS
Filed Nov. 24, 1958  2 Sheets-Sheet 2

INVENTOR.
RALPH R. DILLON
BY *Elliott & Pastoriza*
ATTORNEYS

United States Patent Office 3,033,033
Patented May 8, 1962

3,033,033
FORCE MEASURING APPARATUS
Ralph R. Dillon, Van Nuys, Calif., assignor to W. C. Dillon & Company, Inc., a corporation of California
Filed Nov. 24, 1958, Ser. No. 776,032
3 Claims. (Cl. 73—141)

This invention generally relates to force measuring apparatus and more particularly concerns a device for measuring imposed loads as a function of the deflection or strain occurring in a member in response to the application of the imposed load.

The invention will particularly be described from the standpoint of its application in conjunction with crane apparatus for ascertaining the weight of loads conveyed and carried by such crane units. The device of the present invention is particularly adaptable to interposition in a crane hooking assembly; however, it will be appreciated that the force measuring apparatus as hereafter described and claimed is equally adaptable to other applications, for example, in conjunction with the measurement of the axle load of trucks and other diverse applications.

Under certain circumstances, it is oftentimes difficult and awkward to properly weigh heavy or oddly shaped materials and assemblies for the purpose of determining shipping weight or the like; furthermore, such weights must usually be established not only for shipping purposes but also to ascertain proper safety precautions to be employed in conveying such materials and assemblies from one point to another.

It is, therefore, an object of the present invention to provide a force measuring or load measuring apparatus of simple construction which may be readily embodied in other existing equipments for the purpose of ascertaining the weight of objects.

Another object of the present invention is to provide a force measuring apparatus which may be conveniently embodied in a crane hook assembly for direct measurement of loads carried by the crane without separate weighing scales being required.

Another object of the present invention is to provide a force measuring apparatus which embodies a structure requiring only limited modification of existing equipment.

Another object of the present invention is to provide a force measuring apparatus which may be readily adapted to remote reading indicating instruments and which may be employed for measuring either compressive or tensile forces.

Still another object of the present invention is to provide a force measuring apparatus which may be economically constructed with a minimum number of parts, and which will remain substantially accurate in deflection characteristics over a long period of life.

These and other objects and advantages of the present invention are generally attained by providing a force measuring apparatus including a first C-shaped spring member together with a second C-shaped spring member. The first C-shaped spring member and the second C-shaped spring member are spaced apart with the respective, open portions thereof in face to face relationship. A first platen member interconnects and is rigidly secured to a first pair of opposing end portions of the first and second C-shaped members. A second platen member interconnects and is rigidly secured to the second pair of opposing end portions of the C-shaped members.

In addition, means are incorporated in the apparatus for applying opposing forces to platens, and means are coupled to the platens for indicating the forces applied as a function of the deflection of the platens in response to compression of the C-shaped spring members.

A better understanding of the invention will be had by reference to the drawings showing merely an illustrative embodiment, and in which.

Figure 1:
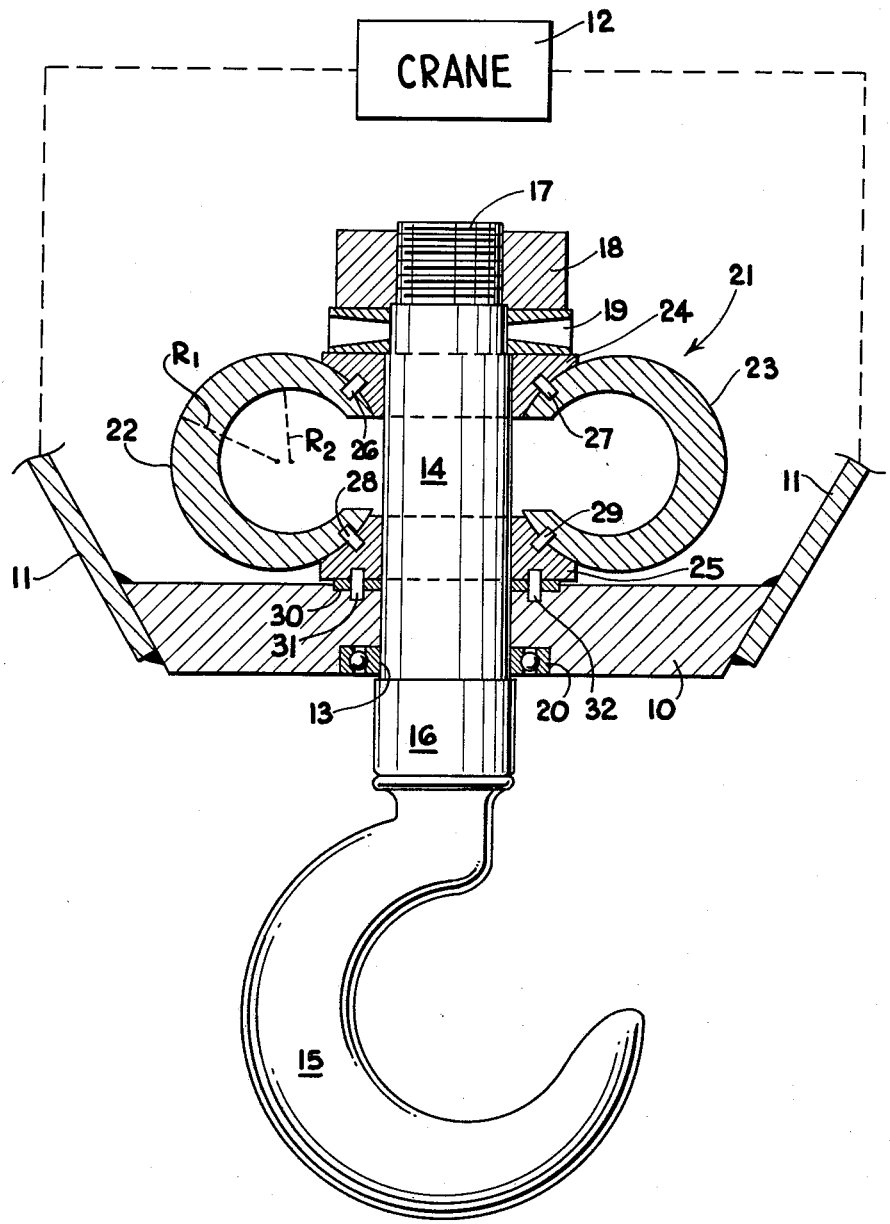
FIGURE 1 is a partial sectional view of a crane hook assembly incorporating the force or load measuring apparatus of the present invention.

Referring now to the drawings, there is shown in FIGURE 1 a conventional base member 10 having rigidly secured thereto side plates 11. The side plates 11 may be welded, as shown, or otherwise securely fastened to the base member 10. The base member 10 and side plates 11 are adapted to be coupled as indicated by the dotted lines to a movable crane 12 which is indicated schematically. Thus, any force imposed downwardly on the base member 10 will be transmitted to the crane structure 12 through the side plates 11. The elements 10, 11, and 12 represent conventional structure in present day crane construction and do not constitute a part of the present invention except insofar as they form a part of the overall combination co-functioning with the force measuring apparatus to be hereafter described.

The base member 10 is provided with a bore 13 to receive a shank 14 carrying a crane hook member 15 connected to the shank 14 through a conventional coupling structure 16. The shank 14, in FIGURE 1, has its upper end threaded at 17 to receive a stem or lock nut 18.

The lock nut 18 has its lower end surface abutting against thrust bearing 19. The bearing 19 and another bearing 20, positioned in the base member 10, adjacent the coupling member 16, enable rotative movement of the shank 14 and corresponding swiveling of the hook 15 for convenience in lifting loads.

Figure 2:
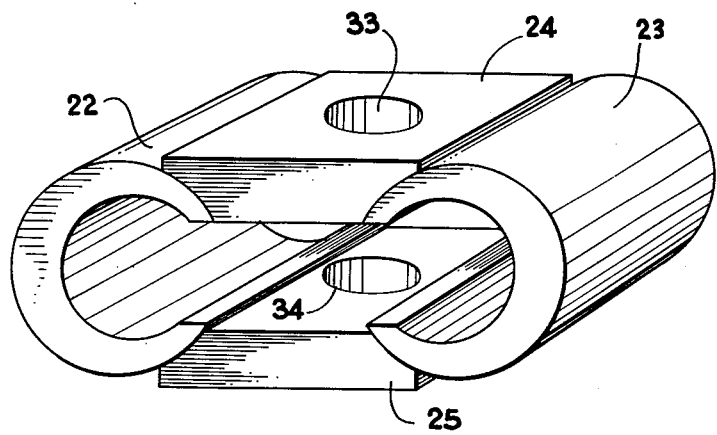
FIGURE 2 is an isometric view of the force measuring apparatus shown in FIGURE 1, according to the present invention; and, FIGURE 3 is a side elevational view of the force measuring apparatus of FIGURE 1 together with force indicating means coupled thereto.

The force measuring apparatus according to the present invention is generally designated by the numeral 21 and includes opposing C-shaped members 22 and 23. The C-shaped members 22 and 23 are of eccentric construction such that the outer radius R–1 of the member 22, for example, has a center of rotation radially spaced from the inner radius R–2 of the member 22. In this regard, the center of rotation of the radius R–1 is spaced a greater distance from the open portion of the C-shaped member 22 than the center of the radius R–2. Thus, the maximum thickness of the member 22 is at a point opposing the open portion thereof. Preferably, as clearly shown in the view of FIGURE 2, the members 22 and 23 are of elongated construction.

The C-shaped members 22 and 23 are connected together to form a monolithic structure by platens 24 and 25. Thus, an upper platen 24 is connected between the upper opposing end portions of the C-shaped members 22 and 23, and similarly a lower platen 25 is connected between the lower pair of opposing end portions of the members 22 and 23. In an illustrative construction, the platen 24 is coupled to the member 22 with a dowel pin 26 and to the member 23 with a dowel pin 27; similarly, the platen 25 is coupled to the member 22 with a dowel pin 28 and the member 23 to the platen 25 with a dowel pin 29. In addition to the dowel pin coupling means used, it is desirable to buttress the respective engaging surfaces of the platens and C-shaped members by some form of metal joining means, for example, brazing.

In order to structurally connect the force measuring apparatus 21 to the base member 10, a recessed locking or locating plate 30 is integrally formed with the lower platen 25 so as to mate with a corresponding recess in the upper end of the base member 10. A further connection between the platen 25 and base member 10 is made through dowel pins 31 and 32.

The platens 24 and 25 are further provided, respectively, with bores 33 and 34 in order to receive the shank 14 of the crane hook 15, whereby the shank may be coupled to the lock nut 18 as heretofore described. The bores 33 and 34 are more clearly shown in the view of FIGURE 2.

With this type of construction, it will be evident that upon coupling of the crane hook 15 to an object, the weight of the object will be transmitted through the shank 14 to the lock nut 18 to exert a downward force on the upper platen 24 through the thrust bearing 19. Similarly, an opposing force will be exerted on the lower platen 25 by the base member 10 in view of the rigid connection between the base member 10 and the crane 12. Thus, the platens 24 and 25 will be loaded in compression according to the weight of the object coupled to the hook 15. The force imposed on the platens 24 and 25 will in turn cause a proportional closing of the gaps in the C-shaped members 22 and 23. Because of the eccentric construction of the C-shaped members 22 and 23, the force measuring apparatus 21 may be used in conjunction with a wide range of loads with a high safety factor and with substantial linearity in deflection of the platens 24 and 25. The eccentric construction of C-shaped members 22 and 23 effects a distribution of the stress throughout the entire periphery of the respective members rather than a concentration of force at a relatively small area as would characterize a concentric construction.

Of course, either mechanical or electrical indicating means may be employed by coupling to the platens 24 and 25 to measure the relative deflections thereof.

Figure 3:
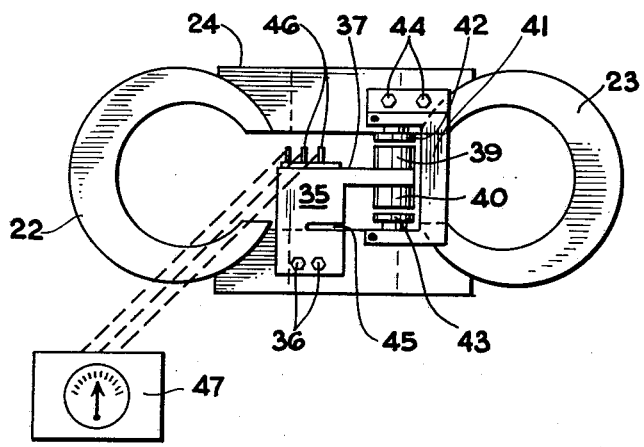

In a preferred construction, electrical transducer means, as more clearly shown in the view of FIGURE 3, are used in order to obtain a remote reading, for example, in the cab of the crane operator. Such transducer means are described in detail in assignee's co-pending application, filed October 6, 1958, and assigned Serial Number 765,593, entitled "Dynamometer."

Briefly, the transducer means comprises supporting means 35 connected, for example, by screws 36 to the lower platen 25. The supporting means 35 includes an integrally formed arm or lever 37 having rigidly secured at the distal end portion thereof transformers 39 and 40.

Another supporting means 41 has adjustably connected thereto discs 42 and 43 adapted to magnetically cooperate, respectively, with transformers 39 and 40. The supporting means 41 may be coupled to the upper platen 24 as by screws 44.

Conventional means for adjusting the disposition of the discs 42 and 43, as indicated in assignee's co-pending application, may be employed together with screw locking means as also disclosed in the referred to application.

Similarly, as shown in FIGURE 3, a slot 45 may be disposed in the supporting means 35 to function for purposes of tare adjustment in accordance with the construction in the above referred to application.

Terminals 46 may be appropriately provided on the support means 35 for connection between the transformers 39 and 40 to an indicating unit 47 to give a reading of the relative voltage and/or current output of the transformers 39 and 40 as a function of the relative deflection of the transformers 39 and 40 and discs 42 and 43 according to movement of the platens 24 and 25 in response to loading on the hook 15. Of course, other forms of transducer means or indicating means may be used to obtain a force reading as a function of the loading on the platens 24 and 25.

It is evident that the force measuring apparatus of the present invention could be employed to measure tensile loads by threading the bores 33 and 34, for example, and connecting load carrying bolts or the like. Furthermore, by inserting a "slug" of metal of predetermined thickness between the inner opposing surfaces of the platens, the force measuring apparatus could be designed to have a maximum reading preventing further loading on the invention apparatus as such. In other words, compression of the platens would be limited by the metal "slug."

It will be apparent from the above description that applicant has provided a simplified force measuring apparatus which may be readily and conveniently embodied in crane hook assemblies as well as equivalent apparatus to obtain direct weight reading without the necessity of separate weighings. It is evident, however, that many changes and modifications may be made in the illustrative apparatus shown and described without departing from the spirit and scope of the invention as set forth in the following claims.

What is claimed is:

1. A force measuring apparatus comprising: a first C-shaped spring member; a second C-shaped spring member; said first C-shaped spring member and said second C-shaped spring member being spaced apart with the respective open portions thereof in face to face relationship; a first platen member interconnecting and rigidly secured to a first pair of opposing end portions of said C-shaped members; a second platen member interconnecting and rigidly secured to the second pair of opposing end portions of said C-shaped members, said platen members defining aligned apertures; means for applying said force to said platens, said means embodying a load carrying member extending through said apertures and coupled to one of said platens; means cooperatively coupled to said platens for indicating said force as a function of the deflection of said platens.

2. A force measuring apparatus comprising: a first C-shaped spring member; a second C-shaped spring member; each of said spring members having its outer radius of curvature eccentric with respect to its inner radius of curvature so as to define a section of maximum width opposing its open area, and said members being spaced apart with the respective open areas thereof in face-to-face relationship; a first platen member interconnecting and rigidly secured to a first pair of opposing end portions of said C-shaped members; a second platen member interconnecting and rigidly secured to the second pair of opposing end portions of said C-shaped members, said platens, respectively, defining aligned apertures; means for applying force to said platens, said means embodying a load carrying member extending through said apertures and coupled to one of said platens; and means coupled to said platens for indicating said force as a function of the deflection of said platens.

3. A force measuring apparatus, according to claim 2, and bearing means supporting and enabling rotation of said load carrying member relative to said platens.

References Cited in the file of this patent

UNITED STATES PATENTS

| | | |
|---|---|---|
| 2,173,493 | Peters | Sept. 19, 1939 |
| 2,396,916 | Guthrie | Mar. 19, 1946 |
| 2,423,867 | Zener et al. | July 15, 1947 |
| 2,476,561 | Pedersen | July 19, 1949 |
| 2,826,062 | Brown et al. | Mar. 11, 1958 |

FOREIGN PATENTS

| | | |
|---|---|---|
| 170,392 | Great Britain | Oct. 19, 1921 |
| 445,345 | Germany | June 3, 1927 |